United States Patent

Hunter

(10) Patent No.: US 9,241,552 B2
(45) Date of Patent: Jan. 26, 2016

(54) LAPTOP KEYBOARD AND MOUSE TRACK PAD PROTECTION SLEEVE

(71) Applicant: Marcellus Duvall Hunter, Forest Hill, MD (US)

(72) Inventor: Marcellus Duvall Hunter, Forest Hill, MD (US)

( * ) Notice: Subject to any disclaimer, the term of this patent is extended or adjusted under 35 U.S.C. 154(b) by 0 days.

(21) Appl. No.: 14/485,011

(22) Filed: Sep. 12, 2014

(65) Prior Publication Data

US 2015/0189961 A1 Jul. 9, 2015

Related U.S. Application Data

(60) Provisional application No. 61/925,508, filed on Jan. 9, 2014.

(51) Int. Cl.
*B41J 29/12* (2006.01)
*A45C 11/00* (2006.01)
*G06F 3/02* (2006.01)

(52) U.S. Cl.
CPC .............. *A45C 11/00* (2013.01); *G06F 3/0202* (2013.01); *A45C 2011/003* (2013.01)

(58) Field of Classification Search
CPC . G06F 3/0202; A45C 11/00; A45C 2011/003
USPC ....... 150/154; 400/496, 713, 714; 235/145 R; 206/320; 312/208.3, 208.4; 361/679.02, 679.26, 679.55; 455/575.8
See application file for complete search history.

(56) References Cited

U.S. PATENT DOCUMENTS

| 4,075,465 | A | | 2/1978 | Funk et al. | |
|---|---|---|---|---|---|
| 5,021,638 | A | * | 6/1991 | Nopper et al. | 235/145 R |
| 5,080,155 | A | | 1/1992 | Crozier | |
| 5,096,317 | A | * | 3/1992 | Phillippe | 400/714 |
| 5,632,373 | A | | 5/1997 | Kumar et al. | |
| 5,944,432 | A | | 8/1999 | Richardson | |
| 6,050,825 | A | | 4/2000 | Nichol et al. | |
| 6,705,787 | B2 | * | 3/2004 | Jeffries et al. | 400/714 |
| 6,887,002 | B1 | | 5/2005 | Chen | |
| 6,984,086 | B1 | * | 1/2006 | Rothman et al. | 400/713 |
| 7,557,312 | B2 | * | 7/2009 | Clark et al. | 200/5 A |
| 7,672,117 | B1 | | 3/2010 | Gary et al. | |
| 8,638,555 | B2 | | 1/2014 | Bekele | |
| 2001/0012196 | A1 | * | 8/2001 | Zamora et al. | 361/680 |
| 2003/0002910 | A1 | * | 1/2003 | Jeffries et al. | 400/714 |
| 2004/0066613 | A1 | * | 4/2004 | Leitao | 361/683 |
| 2012/0161988 | A1 | | 6/2012 | Chang | |
| 2013/0114198 | A1 | * | 5/2013 | Gengler | 361/679.02 |

* cited by examiner

*Primary Examiner* — Luan K Bui
(74) *Attorney, Agent, or Firm* — Dale J. Ream

(57) ABSTRACT

A protection sleeve for use in covering an electronic device includes a flexible body portion having an upper surface defining a plurality of receptacles configured to overlie respective keys of the keyboard and defining a recessed area configured to nest in the mouse track pad of the electronic device. The protection sleeve includes a sleeve portion coupled to a bottom surface of the body portion, the sleeve portion having a front wall coupled to a front edge of the body portion and having a bottom wall extending rearwardly from the front wall that is generally parallel to the upper surface of the body portion. The upper surface of the body portion, the front wall, and the bottom wall together define an open area configured to receive the electronic device and define an open inlet in communication with the open area to selectively receive the electronic device into the open area.

8 Claims, 5 Drawing Sheets

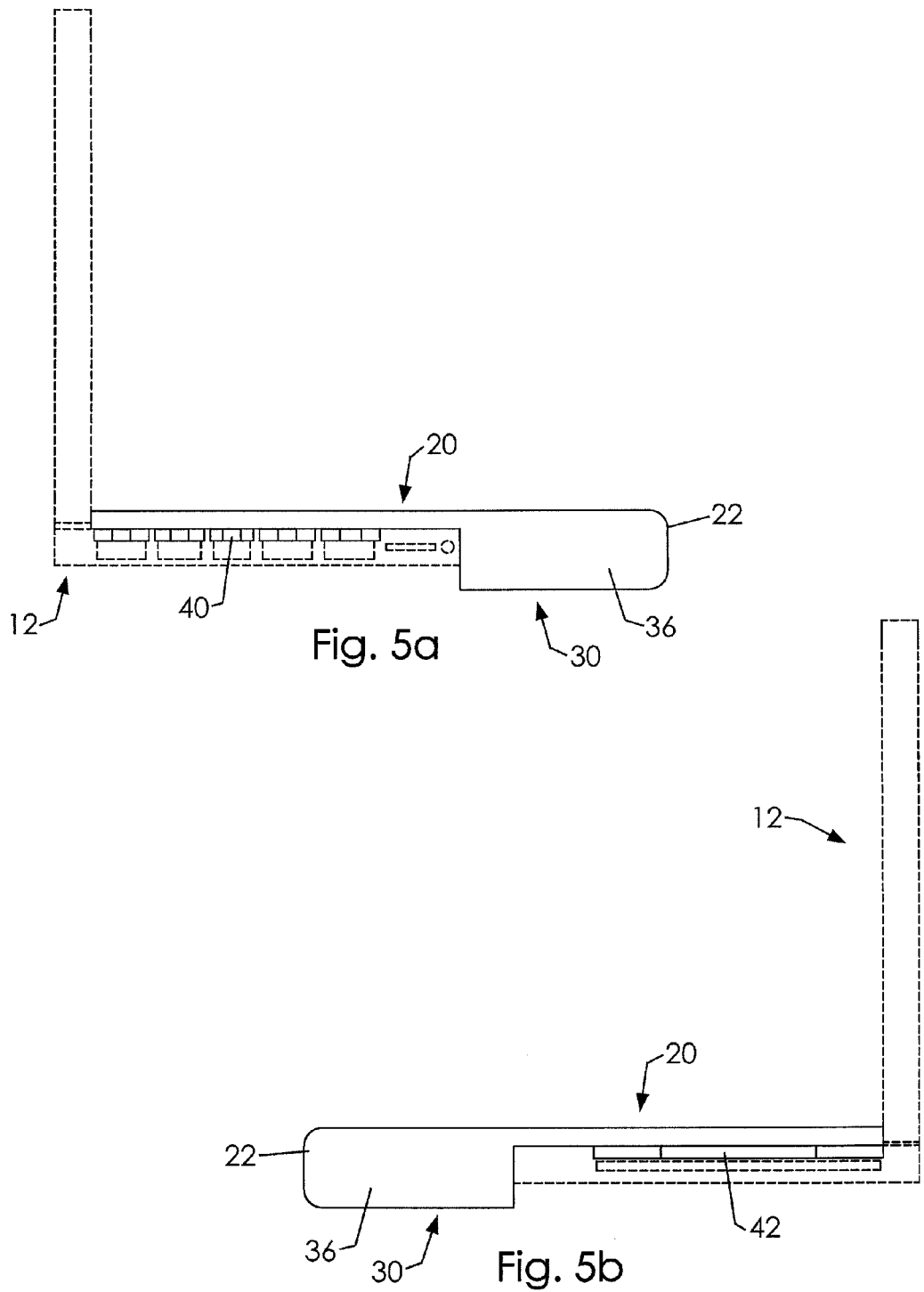

LAPTOP KEYBOARD AND MOUSE TRACK PAD PROTECTION SLEEVE

REFERENCE TO RELATED APPLICATIONS

This application claims the benefit of provisional patent application U.S. Ser. No. 61/925,508 filed Jan. 9, 2014, titled Silicone Cover To Protect A Computer Laptop Keyboard and Mouse Track Pad From Water Damage.

BACKGROUND OF THE INVENTION

The present invention relates generally to keyboard covers and overlays and, more particularly, a keyboard and mouse track pad protection sleeve that includes a sleeve portion configured to receive a portion of the bottom case of a laptop computer and to shield the keys of a keyboard, the mouse track pad, and to provide selective access to side ports of the computer.

Laptop computers are often used on kitchen tables, on the laps of a user, in cars, in classrooms, and in outdoor environments. Laptop computers, in fact, are being made smaller and lighter to reflect the desire to carry them, stow them in travel or book bags, and to have access to them at almost any time. Unfortunately, the ease with which laptop computers accompany their users to almost any environment or location increases the risk that the computer will experience unintended consequences and be damaged. A primary source of damage to a laptop computer is when food or drinks get spilled on the keyboard, which may result in electronic components being ruined and data being lost. In addition, moisture may have similar deleterious effects when spilled on the square or rectangular mouse track pad that is now typically adjacent the keyboard on the bottom case portion of the laptop computer.

Various devices have been proposed in the art for overlaying or covering a computer keyboard. Although assumably effective for their intended purposes, the existing devices and proposals do not provide a sleeve portion configured to receive a portion of the bottom case of the laptop computer and that shields both the keyboard and mouse track pad from moisture provides both protection and access relative to side computer ports.

Therefore, it would be desirable to have a a keyboard and mouse track pad protection sleeve that overcomes the limitations of the prior art.

SUMMARY OF THE INVENTION

A protection sleeve for use in covering an electronic device that includes a keyboard having a plurality of keys and a mouse track pad so as to prevent water damage includes a generally flexible body portion defining a plurality of receptacles configured to overlie respective keys of the keyboard and defining a recessed area configured to nest in the mouse track pad of the electronic device. The protection sleeve includes a sleeve portion coupled to a bottom surface of the body portion, the sleeve portion having a front wall coupled to a front edge of the body portion and extending downwardly therefrom and having a bottom wall extending rearwardly from the front wall that is generally parallel to the upper surface of the body portion. The bottom surface of the body portion, the front wall, and the bottom wall together define an open area configured to selectively receive a partial section of the electronic device and define an open inlet in communication with the open area that is configured to receive the electronic device into the open area.

Therefore, a general object of this invention is to provide a protection sleeve for use in covering an electronic device that includes a keyboard having a plurality of keys and a mouse track pad so as to prevent water damage.

Another object of this invention is to provide a protection sleeve, as aforesaid, that includes a body portion having receptacles configured to overlay the keys of a keyboard and a recessed area configured to nest in the mouse track pad.

Still another object of this invention is to provide a protection sleeve, as aforesaid, having a sleeve portion configured to receive the front section of a lower case portion of a laptop computer so as to properly align the receptacles and recessed area with the keyboard and track pad of the computer, respectively.

Yet another object of this invention is to provide a protection sleeve, as aforesaid, having a plurality of flexible tabs extending downwardly from the body portion and movable between a closed configuration shielding computer ports from moisture and an open configuration exposing the ports for use.

A further object of this invention is to provide a protection sleeve, as aforesaid, that is easy to engage with and remove from a laptop computer.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a perspective view from another angle of the protection sleeve as in FIG. 1a;

FIG. 2a is a top view of the protection sleeve as in FIG. 1a;

FIG. 2b is a sectional view taken along line 2b-2b of FIG. 2a;

FIG. 3b is a perspective view from another angle of the protection sleeve in use with a laptop computer as in FIG. 3a;

FIG. 5a is a side view of the protection sleeve as in FIG. 4; and

FIG. 5b is a side view of an opposite side of the protection sleeve as in FIG. 5a illustrating an auxiliary tab in an open or raised configuration.

DESCRIPTION OF THE PREFERRED EMBODIMENT

Figure 1A:
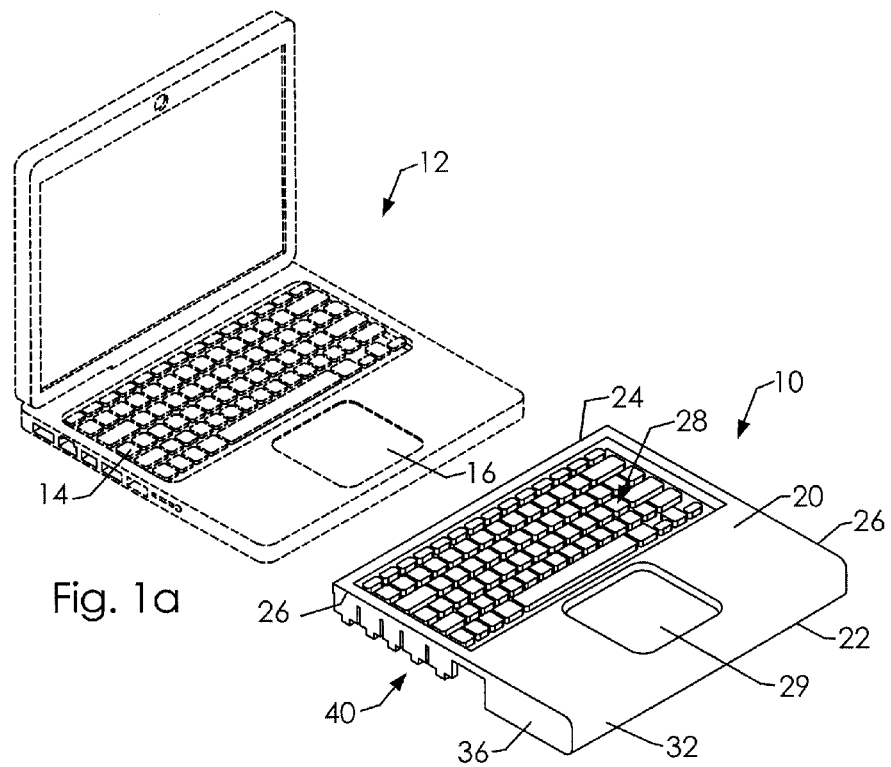
FIG. 1a is a perspective view of a laptop keyboard and mouse track pad protection sleeve according to a preferred embodiment of the present invention, illustrated prior to use with a laptop computer.

A laptop keyboard and mouse track pad protection sleeve according to the present invention will now be described in details with reference to FIGS. 1 to 5b of the accompanying drawings. The protection sleeve 10 includes a body portion 20, a sleeve portion 30, and protective tabs 40 and 42.

Preferably, the body portion 20 is constructed of a flexible silicone material although materials having similar properties would also be suitable. It is critical that the material by which the body portion 20 is constructed is waterproof so that any liquid spilled on the body portion 20 will not pass through to the electronic device. Silicone exhibits the characteristic of being waterproof. The body portion 20 has a relatively thin and generally planar configuration except as described below. The body portion includes a front end 22 and an opposed rear end 24 and includes a pair of opposed side edges 26 extending between the front end 22 and rear end 24. The body portion 20 is configured to overlay the keyboard 14 and keys of an electronic device—such as a laptop computer 12 or the like.

The body portion 20 defines a plurality of receptacles 28, each receptacle 28 being accessible from a bottom surface of the body portion 20 and being configured to receive a respective key of a keyboard of an electronic device, such as a laptop computer 12 (FIG. 1a). Each receptacle 28 extends upwardly from the body portion 20 and has an open end accessible from underneath the body portion 20. In use, the plurality of receptacles 28 enable the body portion 20 to snuggly overlay the keys of a keyboard 14 of a laptop computer 12 or other electronic device having a keyboard. The plurality of receptacles 28 are adjacent one another and arranged in rows in a manner that is complementary to the keys of a keyboard 14 on a laptop computer 12 or other electronic device. Preferably, the receptacles 28 are situated proximate the rear end 24 of the body portion 20 and extend substantially between the side edges 26.

The body portion 20 of the protection sleeve 10 includes a recessed area 29 that extends downwardly and is configured to selectively nest in a mouse track pad 16 of the laptop computer 12 or other electronic device having a track pad (FIG. 1a). More particularly, the recessed area 29 may include a generally square configuration and have a shallow depth when viewed from the upper surface of the body portion 20. The recessed area 29 is situated proximate the front end 22 of the body portion 20 and is forwardly adjacent the plurality of receptacles 28 although it is understood the layout of a keyboard 14 and mouse track pad 16 on some laptop computers may include a different layout than shown in the drawings and such is contemplated by the present invention.

The protection sleeve 10 also includes a sleeve portion 30 coupled to a bottom surface of the body portion 20 adjacent the front wall 32 (FIGS. 1a and 1b), the sleeve portion 30 being configured to receive a portion of a bottom section of a laptop computer 12 or other electronic device therein. More particularly, the sleeve portion 30 may include a front wall 32 extending substantially perpendicular to the upper surface of the body portion 20 adjacent the front end 22 thereof. Stated another way, the front wall 32 extends downwardly from a front edge of the body portion 20. The front wall 32 extends between the opposed side edges 26 of the body portion 20.

Figure 1B:
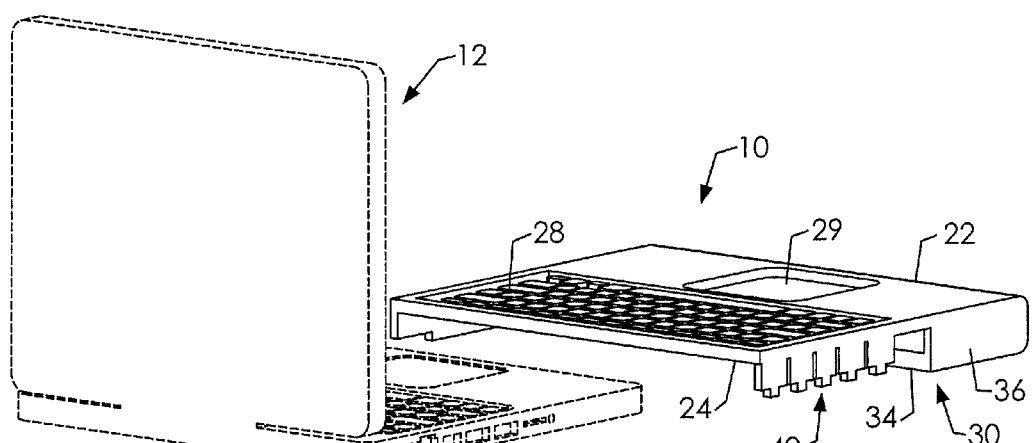
Figure 2A:
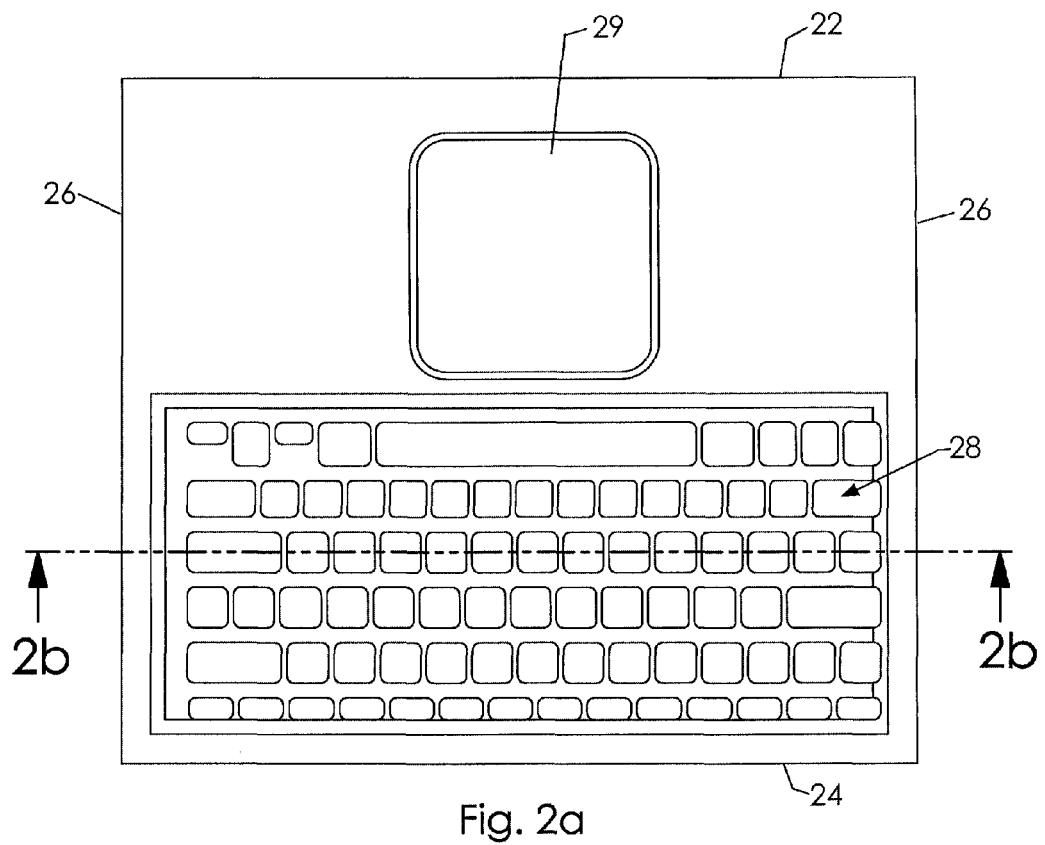
Figure 2B:
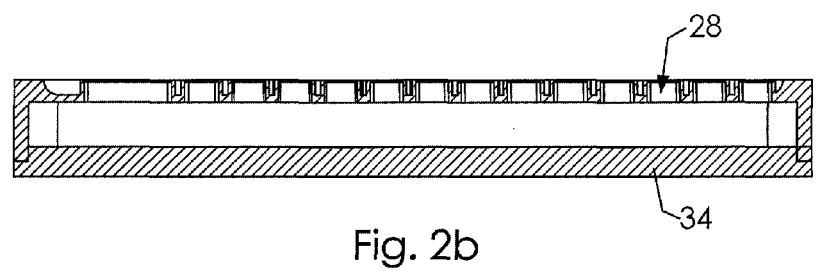
Figure 3A:
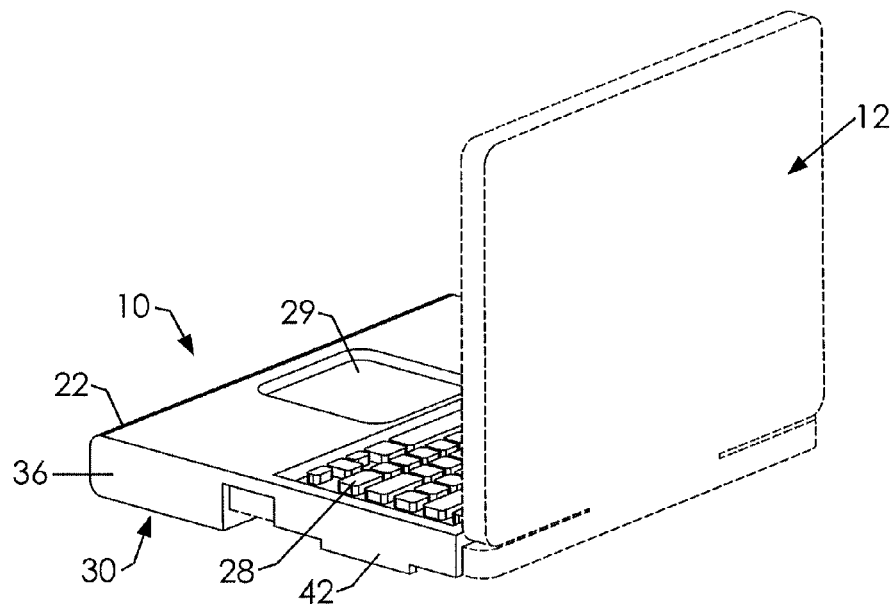
FIG. 3a is a rear perspective view of the protection sleeve in use with a laptop computer.
Figure 3B:
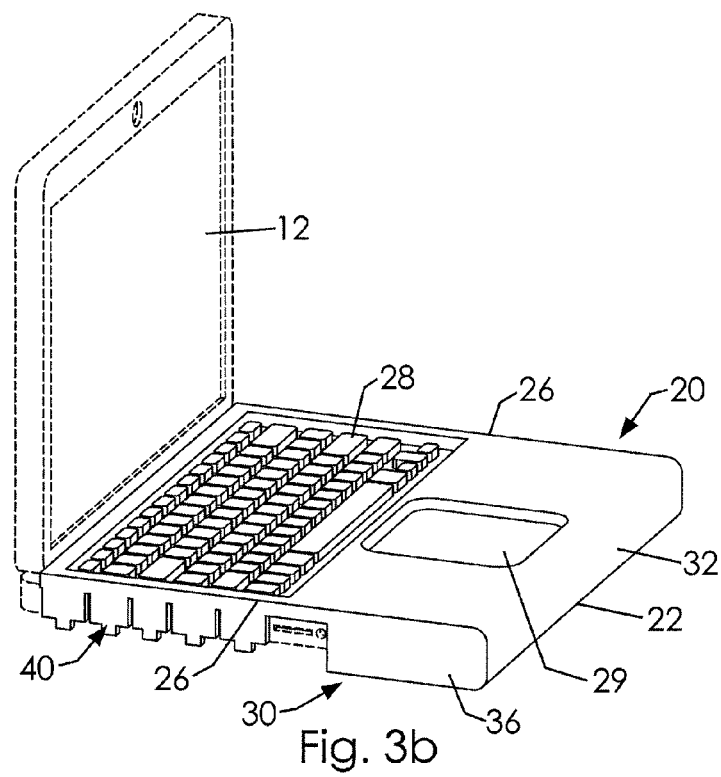

The sleeve portion 30 also includes a bottom wall 34 extending rearwardly from a lower edge of the front wall 32, the bottom wall 34 being parallel to the upper surface of the body portion 20 (FIG. 1b). Further, the sleeve portion 30 may include a pair of opposed side walls 36 that extend downwardly from opposed side edges 26 of the body portion 20 and extend rearwardly from the front wall 32 (FIG. 1a). Together, the front wall 32, the bottom wall 34, the side walls 36 of the sleeve portion 30 along with the bottom surface of the body portion 20 define an open area that is configured to receive a front section of a case of an electronic device such as a laptop computer 12 (FIG. 1b).

Preferably, the sleeve portion 30 is situated adjacent the front end 22 of the body portion 20 and positioned under the recessed area 29 that is configured to interface or nest in the mouse track pad 16 of a laptop computer 12. In other words, the sleeve portion 30 is only intended to receive a partial portion of a laptop computer 12 and not the entire lower case of a computer. This is important so that the laptop computer 12 may be easily and quickly inserted into or removed from the sleeve portion 30. To be clear, the upper surface of the body portion 20 that is laterally adjacent the recessed area 29 forms an upper wall (i.e. a ceiling) of the sleeve portion 30.

Figure 4:
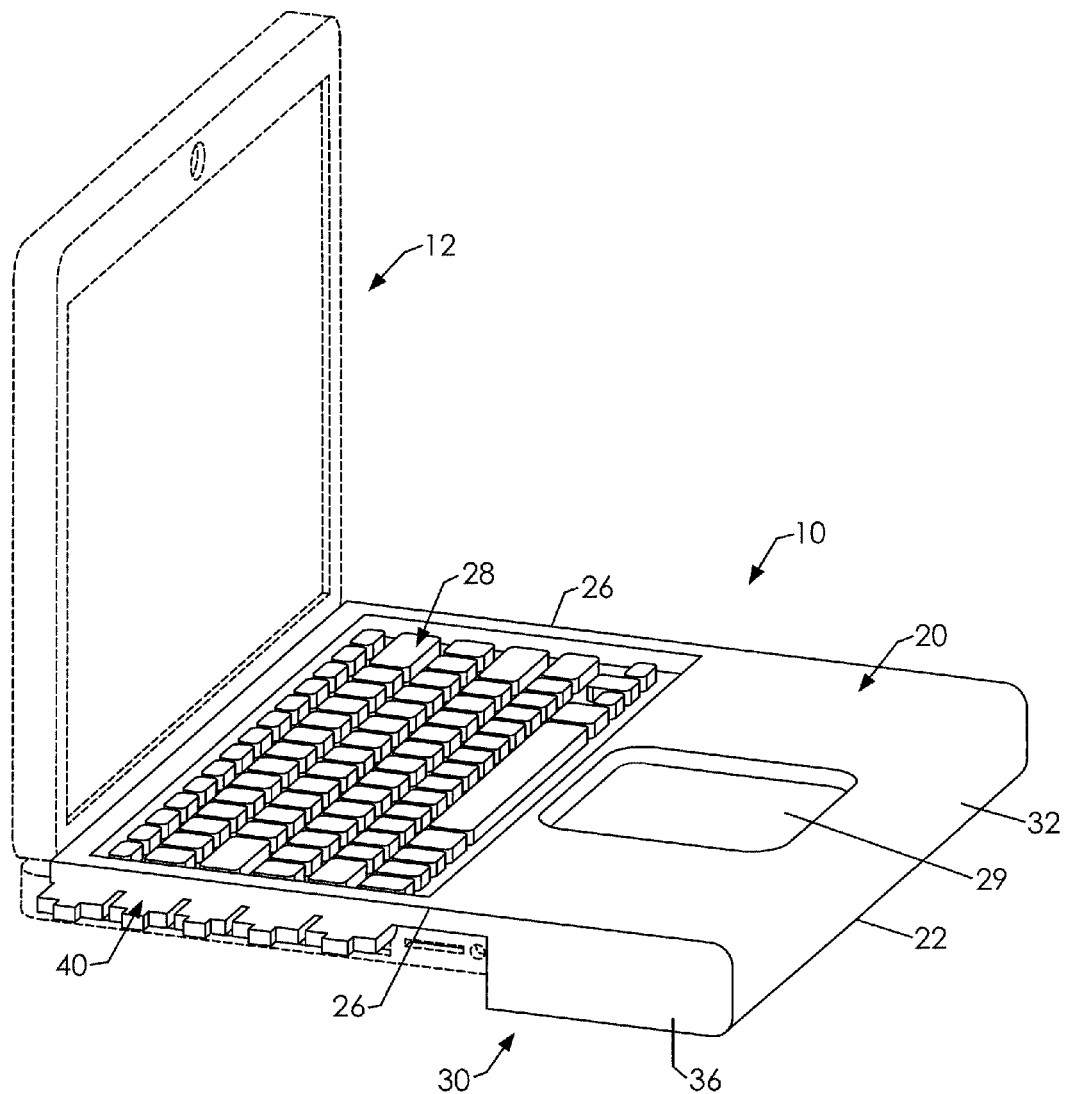
FIG. 4 is an enlarged perspective view of the protection sleeve as in FIG. 3b illustrated with a plurality of tabs in an open or raised configuration.

The body portion 20 may also include a plurality of tabs 40 configured to selectively allow access to respective ports of the electronic device or to cover those ports. The plurality of tabs 40 are independently coupled to one of the side edges 26 of the body portion 20 and may be positioned in a predetermined pattern to be complementary to the ports of a particular brand and model of an electronic device, such as a particular model of a laptop computer 12. The plurality of tabs is preferably constructed of flexible silicone material so as to be selectively movable between a closed configuration hanging downwardly from the respective side edge 26 of the body portion 20 (FIG. 3b) and an open configuration extending outwardly and away from the respective side edge (FIG. 4). By way of example, the plurality of tabs 40 may be configured to cover the adjacent ports of a MacBook Pro® marketed by Apple, Inc., such as a power port, an Ethernet port, two USB ports, a graphics card slot, an audio connection, and other ports.

Similarly, the body portion 20 may also include an auxiliary tab 42 coupled to another of the side edges 26 of the body portion 20. Preferably, the auxiliary tab 42 has a more elongate configuration than any single one of the plurality of tabs and is suitable to cover a CD slot. The auxiliary tab 42 may be constructed of a flexible material so as to be selectively movable between a closed configuration hanging downwardly from the respective side edge 26 of the body portion 20 (FIG. 3a) and an open configuration extending outwardly away from the respective side edge. As shown, the plurality of tabs 40 and the auxiliary tab 42 are situated adjacent the rear end 24 of the body portion.

In one embodiment, the body portion 20 is constructed of an opaque material, such as silicone having a color additive. In this embodiment, the receptacles 28 may include colored indicia indicative of alphanumeric characters associated with the keys over which the body portion 20 is overlaid.

It is understood that the body portion 20, sleeve portion 30, plurality of tabs 40, and auxiliary tab 42 may be constructed of a one piece silicon material and be formed into a protective sleeve 10 as described above. In an embodiment, the silicon material may be perforated with very small holes to allow heat from the computer to be ventilated.

In use, a laptop computer 12 having a keyboard 14, track pad 16, or ports needing protection from liquids may be inserted into the sleeve portion 30. Specifically, a front section of a lower case of the electronics device may be inserted into the open area of the sleeve portion 30 such that the receptacles 28 overlay respective keys of the keyboard 14 and such that the recessed area 29 is nested in the mouse track pad 16. When a desired port needs to be accessed, a respective tab 40 can be manipulated to the open configuration so that the port is easily accessible as described above. Then, the respective tab 40 may be released to hang over the ports and protect them from inadvertent liquid spills.

It is understood that while certain forms of this invention have been illustrated and described, it is not limited thereto except insofar as such limitations are included in the following claims and allowable functional equivalents thereof.

The invention claimed is:

1. A protection sleeve for use in covering an electronic device that includes a keyboard having a plurality of keys and a mouse track pad so as to prevent water damage, comprising:
a generally flexible body portion having a generally planar configuration defining a plurality of receptacles configured to overlie respective keys of the keyboard and defining a recessed area configured to nest in the mouse track pad of the electronic device; and a sleeve portion coupled to a bottom surface of said body portion, said sleeve portion having a front wall coupled to a front edge of said body portion and extending downwardly therefrom and having a bottom wall extending rearwardly from said front wall that is generally parallel to an upper surface of said body portion;

wherein:

said bottom surface of said body portion, said front wall, and said bottom wall together define an open area configured to selectively receive a partial section of the electronic device and define an open inlet in communication with said open area that is configured to receive the electronic device into said open area;

said body portion includes a front end and a rear end opposed from said front end;

said body portion includes a pair of opposed side edges extending between said front end and said rear end; and said sleeve portion includes a pair of side walls opposed from one another that extend downwardly from respective side edges of said body portion and that extend rearwardly from said front wall so as to further enclose said open area of said sleeve portion;

said body portion includes a plurality of spaced apart tabs coupled to a respective side edge of said body portion, each tab having a flexible construction and being movable between a closed configuration hanging downwardly from said respective side edge and a open configuration extending outwardly away from said respective side edge so as to expose a portion of the electronic device when the electronic device is received in said sleeve portion.

2. The protection sleeve as in claim 1, wherein said body portion includes an auxiliary tab coupled to another respective side edge of said body portion, said auxiliary tab having a flexible construction with an elongate configuration that is movable between a closed configuration hanging downwardly from said another side edge and an open configuration extending outwardly away from said respective side edge so as to expose a portion of the electronic device when the electronic device is received in said sleeve portion.

3. The protection sleeve as in claim 2, wherein:

said plurality of tabs is adjacent said rear end of said body portion and displaced from respective side walls of said sleeve portion;

said auxiliary tab is adjacent said rear end of said body portion and displaced from respective side walls of said sleeve portion.

4. The protection sleeve as in claim 3, wherein said body portion is constructed of an opaque material.

5. The protection sleeve as in claim 1, wherein said body portion is constructed of an opaque material.

6. The protection sleeve as in claim 1, wherein said body portion is constructed of a waterproof material.

7. The protection sleeve as in claim 1, wherein:

said upper surface of said body portion that is adjacent said recessed area forms an upper wall of said sleeve portion; and said recessed area is positioned atop said open area of said sleeve portion.

8. The protection sleeve as in claim 1, wherein:

said plurality of receptacles is proximate said rear end of said body portion; and said recessed area is proximate said front end of said body portion.

* * * * *